(12) United States Patent
Vadnais

(10) Patent No.: US 9,033,348 B1
(45) Date of Patent: May 19, 2015

(54) HAND TRUCK

(71) Applicant: Jacqueline M. Vadnais, Bowie, MD (US)

(72) Inventor: Jacqueline M. Vadnais, Bowie, MD (US)

(73) Assignee: JaVa Industries LLC, Bowie, MD (US)

( * ) Notice: Subject to any disclaimer, the term of this patent is extended or adjusted under 35 U.S.C. 154(b) by 0 days.

(21) Appl. No.: 14/300,313

(22) Filed: Jun. 10, 2014

(51) Int. Cl.
  *B62B 1/00* (2006.01)
  *B62B 1/10* (2006.01)

(52) U.S. Cl.
  CPC .................................... *B62B 1/10* (2013.01)

(58) Field of Classification Search
  CPC ............ B62B 1/04; B62B 1/042; B62B 1/06; B62B 2206/02; B62B 2206/04; B62B 1/10
  USPC ........ 280/47.131, 47.17, 47.18, 47.19, 47.24, 280/47.27, 47.28, 47.29
  See application file for complete search history.

(56) References Cited

U.S. PATENT DOCUMENTS

| | | | | |
|---|---|---|---|---|
| 4,830,385 | A * | 5/1989 | Wallick et al. | 280/35 |
| 5,678,842 | A * | 10/1997 | Hook et al. | 280/646 |
| 5,803,471 | A * | 9/1998 | DeMars et al. | 280/40 |
| 7,044,484 | B2 * | 5/2006 | Wang | 280/47.27 |
| 7,188,859 | B2 * | 3/2007 | Hardin et al. | 280/652 |
| 7,258,352 | B2 * | 8/2007 | Odgers | 280/47.28 |
| 7,387,306 | B2 * | 6/2008 | Zimmer | 280/47.29 |
| 2007/0096437 | A1 * | 5/2007 | Watson | 280/651 |
| 2010/0200525 | A1 * | 8/2010 | Keyvanloo | 211/59.2 |
| 2014/0021698 | A1 * | 1/2014 | Beckman et al. | 280/651 |
| 2014/0265189 | A1 * | 9/2014 | Drowanowski et al. | 280/47.17 |
| 2014/0265253 | A1 * | 9/2014 | Ingrasci | 280/638 |

OTHER PUBLICATIONS

WelCom Products—Magna Cart, http://welcomproducts.com/2010Vers2/page6/page6.html.

* cited by examiner

*Primary Examiner* — John Walters
*Assistant Examiner* — Brian Swenson
(74) *Attorney, Agent, or Firm* — Rahman LLC

(57) ABSTRACT

A hand truck includes a noseplate; a pair of brackets positioned on opposite ends of the noseplate; a pair of wheels operatively connected to the pair of brackets; a frame upwardly extending from the pair of brackets. The frame includes a horizontal cross bar extending from a first bracket of the pair of brackets to a second bracket of the pair of brackets. A pair of connection bars upwardly extend at an angle from the horizontal cross bar and connect at a confluence point. A single vertical bar upwardly extends from the confluence point. A handle operatively connects to a top of the single vertical bar. A pair of arms extends from the single vertical bar. The pair of arms rotate between a first position and second position. The first position is 0° from the single vertical bar. The second position is 90° from the single vertical bar.

20 Claims, 5 Drawing Sheets

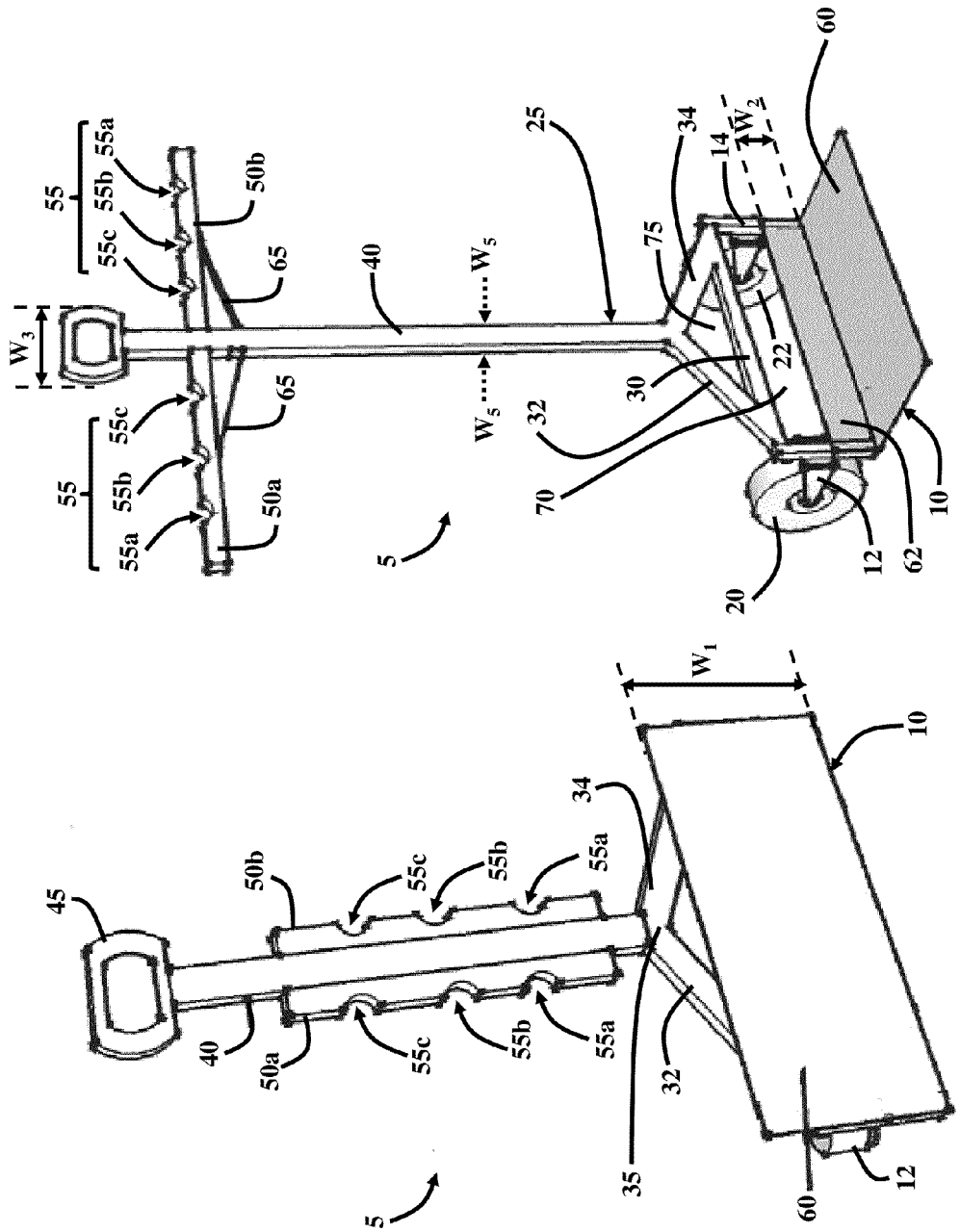

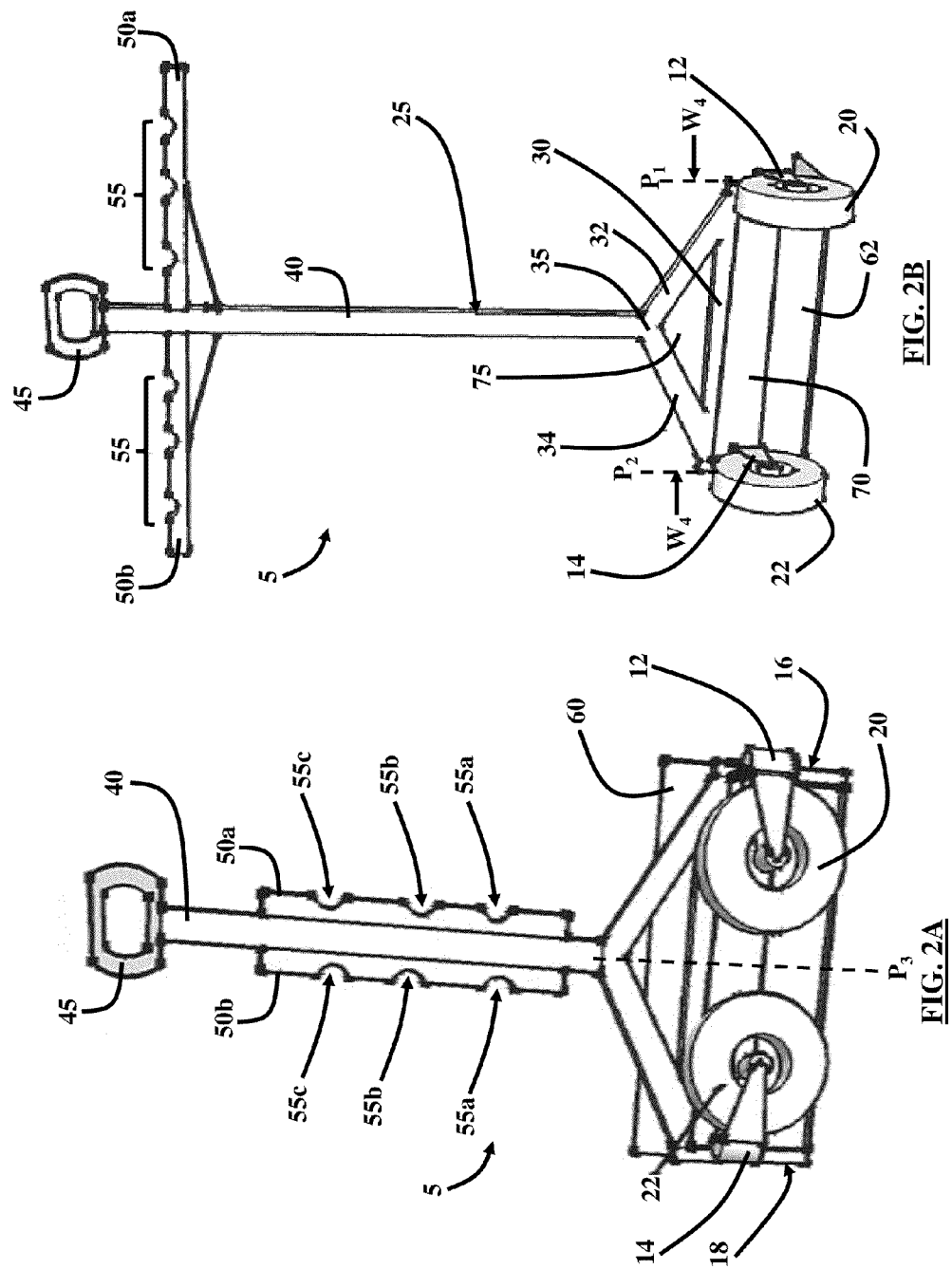

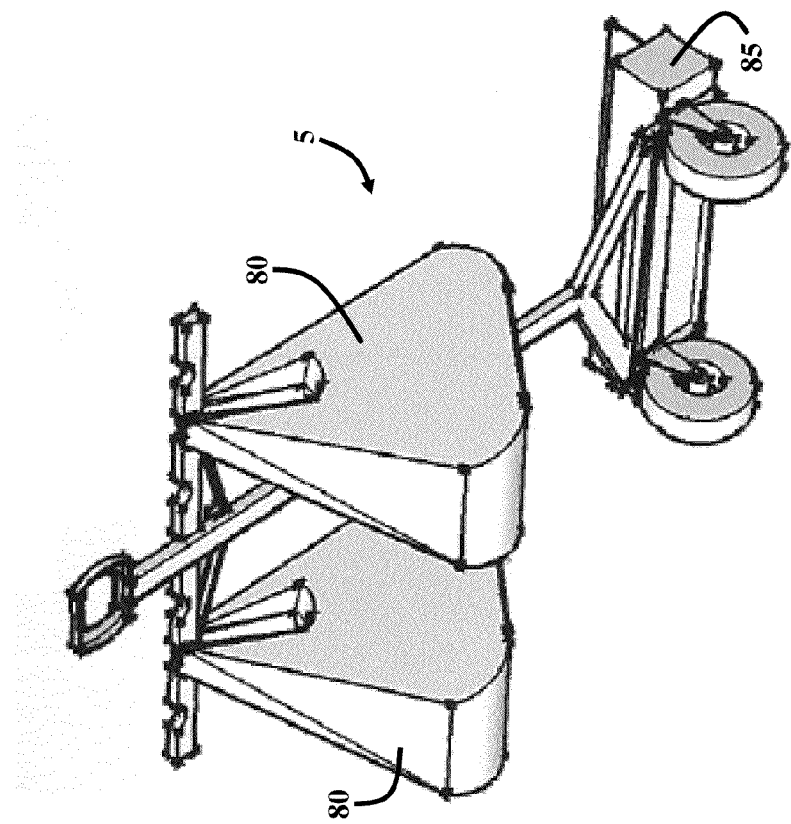
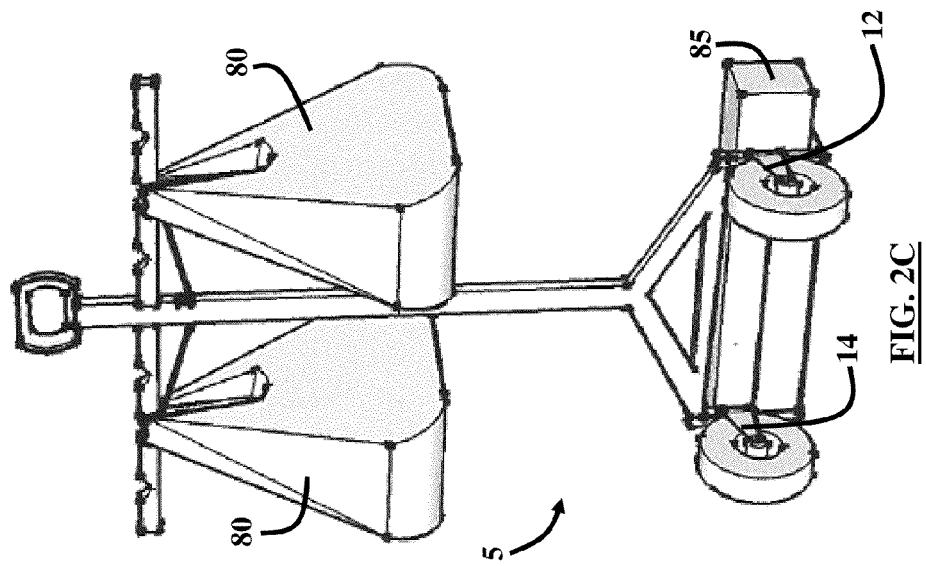
FIG. 2D
FIG. 2C

HAND TRUCK

BACKGROUND

1. Technical Field

The embodiments herein generally relate to portable carts and dollies, and more particularly to hand trucks.

2. Description of the Related Art

The typical hand truck contains a H-frame between the noseplate and the handle, and is designed solely to transport boxes and square/rectangular items. Grocery and other types of shopping bags generally do not stack well on conventional hand trucks given their uneven shape and distribution of weight. A standard "grocery cart" is basically a big bin on wheels with a handle which is not suitable for stacking fragile grocery items such as bread and eggs. When people arrive home after shopping, particularly grocery shopping, they typically must make several trips from their car to their home in order to bring all of the shopping bags inside. This task is particularly daunting for the elderly and pregnant women or those who live in multi-family dwellings, such as apartments or condos, where parking is not typically near the entrance to the building. Moreover, the task can be extremely difficult when the shopping items are heavy cases of soda or bottled water. In fact, many people living in the city or who do not have a car must carry their shopping bags and/or shopping boxes/crates/cases home from the store itself. Therefore, an easy to use and portable hand truck would be advantageous for such a situation.

SUMMARY

In view of the foregoing, an embodiment herein provides a hand truck comprising a noseplate; a pair of brackets positioned on opposite ends of the noseplate; a pair of wheels operatively connected to the pair of brackets; a frame upwardly extending from the pair of brackets, wherein the frame comprises a horizontal cross bar extending from a first bracket of the pair of brackets to a second bracket of the pair of brackets; a pair of angled bars upwardly extending and at an angle from the horizontal cross bar and connecting at a confluence point; and a single vertical bar upwardly extending from the confluence point. The hand truck further comprises a handle operatively connected to a top of the single vertical bar; and a pair of arms extending from the single vertical bar, wherein the pair of arms rotate between a first position and second position, wherein the first position comprises 0° from the single vertical bar, and wherein the second position comprises 90° from the single vertical bar.

The noseplate may rotate with respect to the pair of brackets. The pair of wheels may rotate with respect to the pair of brackets. The pair of arms may comprise at least one notch configured therein. The noseplate may comprise a L-shaped body comprising a first portion comprising a width that is greater than a width of the second portion. The first portion may abut the horizontal cross bar and the pair of connection bars upon the noseplate being rotated into a closed position. The pair of wheels may rotate inward towards each other upon the noseplate being rotated into a closed position. The hand truck may further comprise a mechanism that connects the pair of arms to the single vertical bar, wherein the mechanism may lock the pair of arms into the second position.

The hand truck may further comprise a gap in between the horizontal cross bar and the noseplate. The hand truck may further comprise a gap in between the confluence point and the horizontal cross bar. The single vertical bar may telescope to change a height of the single vertical bar. The pair of arms may comprise a first arm and a second arm, wherein the first arm and the second arm may rotate independent of each other. Alternatively, the first arm and the second arm may rotate in tandem with one another.

The handle may comprise a width less than a width of the horizontal cross bar. The handle may comprise a width greater than a width of the single vertical bar. The pair of arms may extend past a lateral position of the pair of wheels in the second position. The at least one notch may comprise at least three notches. The at least three notches may be equally spaced apart from one another. The confluence point and the single vertical bar may be positioned at a center position in between the pair of brackets, the pair of wheels, and with respect to the noseplate.

Another embodiment provides a hand truck comprising a noseplate; a pair of brackets positioned on opposite ends of the noseplate; a pair of wheels operatively connected to the pair of brackets; a frame upwardly extending from the pair of brackets, wherein the frame comprises a horizontal cross bar extending from a first bracket of the pair of brackets to a second bracket of the pair of brackets; a pair of connection bars upwardly extending and at an angle from the horizontal cross bar and connecting at a confluence point, wherein the confluence point is positioned above the horizontal cross bar; and a single vertical bar upwardly extending from the confluence point. The hand truck further comprises a handle operatively connected to a top of the single vertical bar; and a pair of arms extending from the single vertical bar, wherein the pair of arms are positioned at an angle of 90° from the single vertical bar.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is an angled front perspective view of a hand truck in a closed position according to an embodiment herein;

FIG. 1B is an angled front perspective view of the hand truck of FIG. 1A in an open position according to an embodiment herein;

FIG. 2A is an angled rear perspective view of a hand truck in a closed position according to an embodiment herein;

FIG. 2B is an angled rear perspective view of the hand truck of FIG. 2A in an open position according to an embodiment herein;

FIG. 2C is an angled rear perspective view of the hand truck of FIG. 2B in an open position and holding containers according to an embodiment herein;

FIG. 2D is an angled rear perspective view of the hand truck of FIG. 2C in an angled open position according to an embodiment herein.

DETAILED DESCRIPTION

Figure 1D:
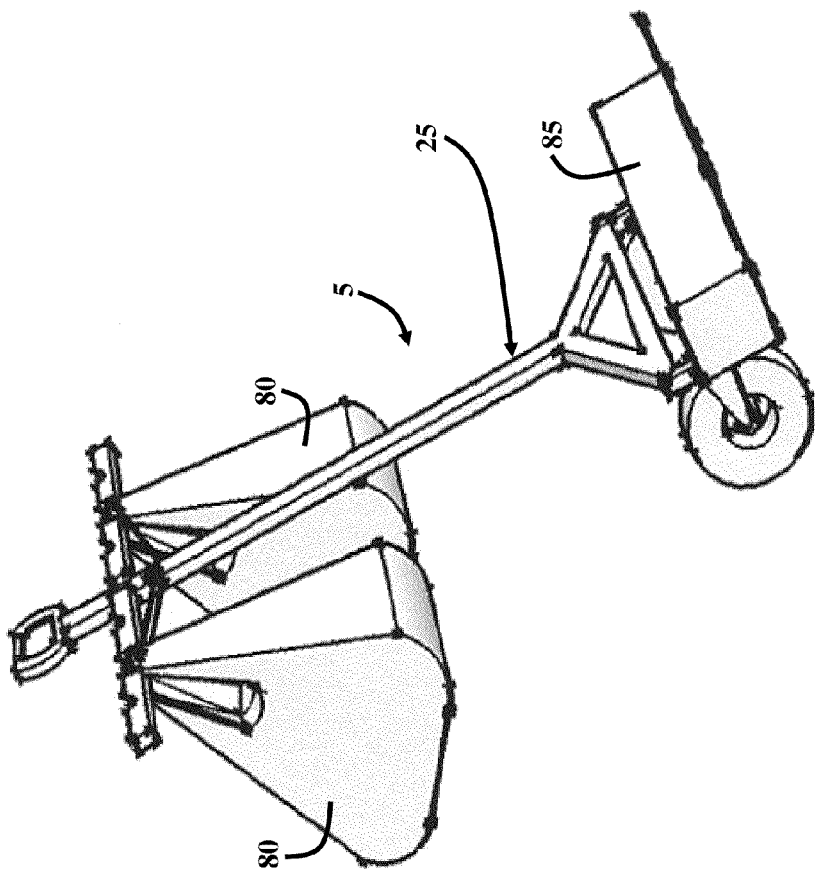
FIG. 1D is an angled front perspective view of the hand truck of FIG. 1C in an angled open position according to an embodiment herein.
Figure 1C:
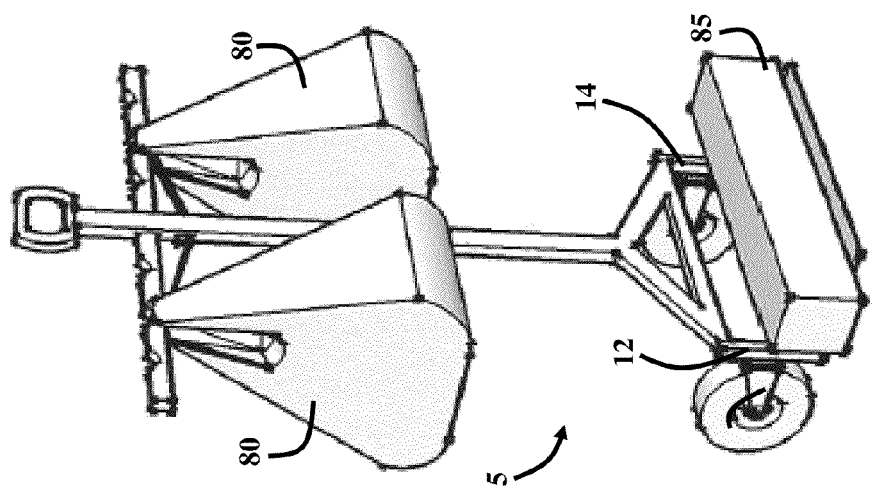
FIG. 1C is an angled front perspective view of the hand truck of FIG. 1B in an open position and holding containers according to an embodiment herein.
Figure 3:
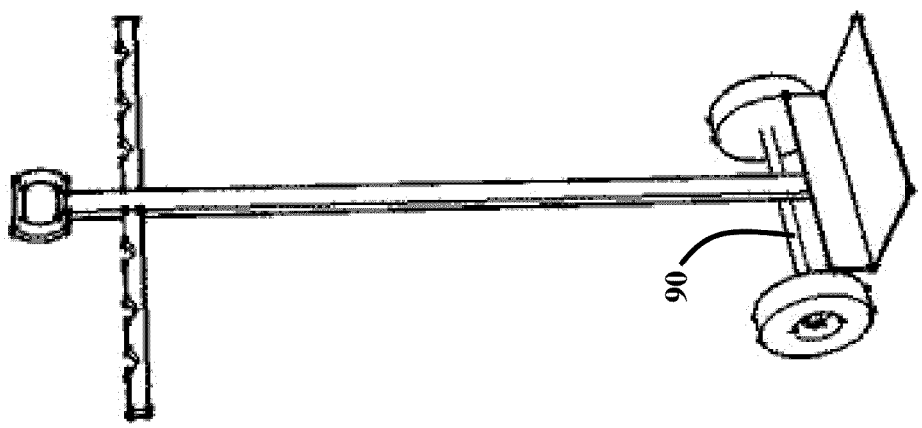
FIG. 3 is an angled front perspective view of a hand truck according to an alternative embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a hand truck with single handle, but without the typical H-frame between the noseplate and handle. The hand truck includes a center vertical bar or column with horizontal notched arms connected thereto. Referring now to the drawings, and more particularly to FIGS. 1A through 3, where similar reference characters denote corresponding features consistently throughout the figures, there are shown preferred embodiments.

As shown in FIGS. 1A through 2D, the hand truck 5 comprises a noseplate 10, a pair of brackets 12, 14 positioned on opposite ends 16, 18 of the noseplate 10, a pair of wheels 20, 22 operatively connected to the pair of brackets 12, 14, and a frame 25 upwardly extending from the pair of brackets 12, 14, wherein the frame 25 comprises a horizontal cross bar 30 extending from a first bracket 12 of the pair of brackets 12, 14 to a second bracket 14 of the pair of brackets 12, 14, a pair of connection bars 32, 34 upwardly extending and at an angle from the horizontal cross bar 30 and connecting at a confluence point 35, and a single vertical bar 40 upwardly extending from the confluence point 35. In one embodiment, the pair of connection bars 32, 34 are not parallel to one another so that they may meet at the confluence point 35, and accordingly the angle between each bar 32, 34, respectively, and the horizontal cross bar 30 is an acute angle, in one embodiment. The pair of brackets 12, 14 may be any suitable bracket that allows for a plurality of members (e.g., pair of wheels 20, 22, noseplate 10, and frame 25) to all operatively connect thereon. The pair of brackets 12, 14 may be a single piece or multi-piece mechanism. In one example embodiment, the pair of brackets 12, 14 may be configured similarly to the brackets provided by the Magna Cart™ MCX hand truck available from WelCom Products, California, USA, http://welcomproducts.com/2010Vers2/page6/page6.html, the complete disclosure of which, in its entirety is herein incorporated by reference.

The hand truck 5 further comprises a handle 45 operatively connected to a top of the single vertical bar 40, and a pair of arms 50a, 50b extending from the single vertical bar 40, wherein the pair of arms 50a, 50b rotate between a first position and a second position, wherein the first position comprises 0° from the single vertical bar 40, and wherein the second position comprises 90° from the single vertical bar 40. In another embodiment, the pair of arms 50a, 50b do not rotate between a first position and a second position and are affixed in an open (e.g., 90° from the single vertical bar 40) position. The noseplate 10 may rotate with respect to the pair of brackets 12, 14. In another embodiment, the noseplate 10 does not rotate with respect to the pair of brackets 12, 14. The pair of wheels 20, 22 may rotate with respect to the pair of brackets 12, 14. In another embodiment shown in FIG. 3 (with respect to FIGS. 1A through 2D), the pair of wheels 20, 22 do not rotate with respect to the pair of brackets 12, 14 and may be connected to one another with a single rigid axle 90 therebetween. In this embodiment, the single vertical bar 40 may be configured without the confluence point 35 or the pair of connection bars 32, 34. The pair of arms 50a, 50b preferably comprise at least one notch 55 (notches 55a, 55b, 55c) configured therein.

In one embodiment, the noseplate 10 comprises a L-shaped platform-style body comprising a first portion 60 comprising a width $W_1$ that is greater than a width $W_2$ of the second portion 62. The first portion 60 may abut the horizontal cross bar 30 and the pair of connection bars 32, 34 upon the noseplate 10 being rotated into a closed position. The pair of wheels 20, 22 may rotate inward towards each other upon the noseplate 10 being rotated into a closed position. The hand truck 5 may further comprise a mechanism 65 that connects the pair of arms 50a, 50b to the single vertical bar 40, wherein the mechanism 65 may lock the pair of arms 50a, 50b into the second position. The mechanism 65 may include any type of bracket, hinge, spring, cam, lever, link, bar, screw, etc. which allows rotation or translation of one member with respect to another member. The mechanism 65 may be foldable or collapsible in one embodiment. For example, the mechanism 65 may be configured as support brackets that are spring-loaded so that they pop out when the pair of arms 50a, 50b are raised (open/second position) and then a user would just squeeze the mechanism 65 to collapse the pair of arms 50a, 50b (closed/first position).

The mechanism 65 provides for ample resistive force to lock into position once the pair of arms 50a, 50b are in the full horizontal/open position (e.g., 90° with respect to the single vertical bar 40). The resistive force is sufficient to support the weight of bags 80 being placed on the pair of arms 50a, 50b (e.g., hanging from the at least one notch 55). In yet another alternate embodiment, the pair of arms 50a, 50b may be welded to the mechanism 65, which may be removable to allow the pair of arms 50a, 50b to open in the horizontal/open/second position when the mechanism 65 is attached to the single vertical bar 40, and the pair of arms 50a, 50b may be moved to the closed/vertical/first position when the mechanism 65 is detached from the single vertical bar 40. Other alternatives are possible for the manner in which the pair of arms 50a, 50b are raised/lowered and attached to the single vertical bar 40, and the embodiments herein are not restricted to a particular embodiment or configuration. The hand truck 5 may further comprise a gap 70 in between the horizontal cross bar 30 and the noseplate 10. The hand truck 5 may further comprise a gap 75 in between the confluence point 35 and the horizontal cross bar 30.

The single vertical bar 40 may telescope to change a height of the single vertical bar 40. The pair of arms 50a, 50b comprise a first arm 50a and a second arm 50b, wherein the first arm 50a and the second arm 50b may rotate independent of each other. Alternatively, the first arm 50a and the second arm 50b rotate in tandem with one another. In one embodiment, the handle 45 comprises a width $W_3$ less than a width $W_4$ of the horizontal cross bar 30. In one embodiment the handle 45 comprises a width $W_3$ greater than a width $W_5$ of the single vertical bar 40. The pair of arms 50a, 50b may extend past a lateral position $P_1$, $P_2$ of the pair of wheels 20, 22 in the second position. The at least one notch 55 (notches 55a, 55b, 55c) may comprise at least three notches 55a, 55b, 55c, wherein the at least three notches 55a, 55b, 55c may be equally spaced apart from one another. The grocery bags 80 can hang from the notches 55a, 55b, 55c without sliding off as indicated in FIGS. 1C, 1D, 2C, and 2D. The confluence point 35 and the single vertical bar 40 are preferably positioned at a center position $P_3$ in between the pair of brackets 12, 14, the pair of wheels 20, 22, and with respect to the noseplate 10.

The pair of wheels 20, 22 behind the noseplate 10 allows for mobility of the hand truck 5 once the hand truck 5 is tilted back by the user (as indicated in FIGS. 1D and 2D). In the embodiments where the single vertical bar 40 telescopes down and the noseplate 10, pair of wheels 20, 22, and pair of arms 50a, 50b fold/rotate allow for easy storage of the hand truck 5. The various components of the hand truck 5 may be made from aluminum, fiberglass, or plastic, for example, to allow for a lighter weight hand truck 5, although other materials are possible including heavier materials such as steel, and the embodiments herein are not restricted to a particular material(s) or class of material(s). By using horizontal arms 50a, 50b with notches 55a, 55b, 55c instead of a typical H-frame present in conventional hand trucks, a user will be able to hang shopping bags 80 from each notch 55a, 55b, 55c and separately store heavier items 85 (e.g., boxes, crates, cases, etc.) without damaging the contents therein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A hand truck comprising:
a noseplate;
a pair of brackets positioned on opposite ends of said noseplate;
a pair of wheels operatively connected to said pair of brackets;
a frame upwardly extending from said pair of brackets, wherein said frame comprises:
a horizontal cross bar extending from a first bracket of said pair of brackets to a second bracket of said pair of brackets;
a pair of connection bars upwardly extending and at an angle from said horizontal cross bar and connecting at a confluence point; and
a single vertical bar upwardly extending from said confluence point;
a handle operatively connected to a top of said single vertical bar; and
a pair of arms extending from said single vertical bar, wherein said pair of arms rotate between a first position and second position, wherein said first position comprises 0° from said single vertical bar, and wherein said second position comprises 90° from said single vertical bar.

2. The hand truck of claim 1, wherein said noseplate rotates with respect to said pair of brackets.

3. The hand truck of claim 2, wherein said noseplate comprises a L-shaped body comprising a first portion comprising a width that is greater than a width of said second portion.

4. The hand truck of claim 3, wherein said first portion abuts said horizontal cross bar and said pair of connection bars upon said noseplate being rotated into a closed position.

5. The hand truck of claim 1, wherein said pair of wheels rotate with respect to said pair of brackets.

6. The hand truck of claim 5, wherein said pair of wheels rotate inward towards each other upon said noseplate being rotated into a closed position.

7. The hand truck of claim 1, wherein said pair of arms comprise at least one notch configured therein.

8. The hand truck of claim 7, wherein said at least one notch comprises at least three notches.

9. The hand truck of claim 1, further comprising a mechanism that connects said pair of arms to said single vertical bar.

10. The hand truck of claim 9, wherein said mechanism locks said pair of arms into said second position.

11. The hand truck of claim 1, further comprising a gap in between said horizontal cross bar and said noseplate.

12. The hand truck of claim 1, further comprising a gap in between said confluence point and said horizontal cross bar.

13. The hand truck of claim 1, wherein said single vertical bar telescopes to change a height of said single vertical bar.

14. The hand truck of claim 1, wherein said pair of arms comprise a first arm and a second arm, wherein said first arm and said second arm rotate independent of each other.

15. The hand truck of claim 1, wherein said pair of arms comprise a first arm and a second arm, wherein said first arm and said second arm rotate in tandem with one another.

16. The hand truck of claim 1, wherein said handle comprises a width less than a width of said horizontal cross bar.

17. The hand truck of claim 1, wherein said handle comprises a width greater than a width of said single vertical bar.

18. The hand truck of claim 1, wherein said pair of arms extend past a lateral position of said pair of wheels in said second position.

19. The hand truck of claim 1, wherein said confluence point and said single vertical bar are positioned at a center position in between said pair of brackets, said pair of wheels, and with respect to said noseplate.

20. A hand truck comprising:
a noseplate;
a pair of brackets positioned on opposite ends of said noseplate;
a pair of wheels operatively connected to said pair of brackets;
a frame upwardly extending from said pair of brackets, wherein said frame comprises:
a horizontal cross bar extending from a first bracket of said pair of brackets to a second bracket of said pair of brackets;
a pair of connection bars upwardly extending and at an angle from said horizontal cross bar and connecting at a confluence point, wherein said confluence point is positioned above said horizontal cross bar; and
a single vertical bar upwardly extending from said confluence point;
a handle operatively connected to a top of said single vertical bar; and
a pair of arms extending from said single vertical bar, wherein said pair of arms are positioned at an angle of 90° from said single vertical bar.

* * * * *